United States Patent [19]
Davis

[11] Patent Number: 5,924,834
[45] Date of Patent: *Jul. 20, 1999

[54] MACHINE FOR PROCESSING SCRAP METAL CONTAINERS

[75] Inventor: Robert M. Davis, El Cajon, Calif.

[73] Assignee: CP Manufacturing, Inc., San Diego, Calif.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/887,878

[22] Filed: Jul. 3, 1997

Related U.S. Application Data

[63] Continuation-in-part of application No. 08/813,826, Mar. 6, 1997., Pat. No. 5,829,943

[51] Int. Cl.$^6$ ................................................. B65G 65/00
[52] U.S. Cl. ........................ 414/412; 241/261; 414/810
[58] Field of Search ...................... 414/412, 786, 414/810; 241/261; 209/690, 696, 697, 930

[56] References Cited

U.S. PATENT DOCUMENTS

| | | | |
|---|---|---|---|
| 223,689 | 1/1880 | Adams | 241/261 X |
| 4,168,035 | 9/1979 | Palm et al. | 241/261 X |
| 4,182,592 | 1/1980 | Henryson | 414/412 |
| 4,214,713 | 7/1980 | Wright | 241/57 |
| 4,852,817 | 8/1989 | Tipton | 241/260.1 |
| 4,930,968 | 6/1990 | Borglund | 414/412 |
| 5,163,627 | 11/1992 | Bouche | 414/412 X |
| 5,315,923 | 5/1994 | Tokarski et al. | 100/39 |
| 5,484,247 | 1/1996 | Clark et al. | 414/412 |
| 5,551,825 | 9/1996 | Montgomery | 414/412 |

FOREIGN PATENT DOCUMENTS

| | | | |
|---|---|---|---|
| 3346542 | 7/1985 | Germany | 414/412 |
| 38 03 689 | 8/1989 | Germany . | |
| 878668 | 11/1981 | U.S.S.R. | 414/412 |
| 981108 | 12/1982 | U.S.S.R. | 414/412 |
| 1288118 | 2/1987 | U.S.S.R. | 414/412 |
| 1514670 | 10/1989 | U.S.S.R. | 414/412 |
| 2028255 | 3/1980 | United Kingdom | 414/412 |

*Primary Examiner*—David A. Bucci
*Attorney, Agent, or Firm*—Gray Cary Ware Freidenrich

[57] ABSTRACT

A machine agitates and rips scrap metal containers such as scrap aluminum cans to expose their interiors and shake out sand, dirt, and other material in the cans. Alternatively, the containers may comprise shell casings which the machine deforms by thrashing. The machine has an enclosure in which a rotatable shaft is supported. A plurality of blade sets are mounted on the shaft within the enclosure to rotate the shaft. The blade sets are distributed along the shaft and interleaved with a plurality of angled, stationary vanes that are mounted to an inside surface of the enclosure. These parts cooperate when the shaft is rotated by propelling containers on a helical path on which the blade sets batter, thrash, and rip the containers, throwing them against the vanes and the sides of the enclosure. As cans are battered and agitated by the blades, their contents are emptied and the cans are ultimately propelled to a collection point. As shell casings are thrashed by the blades and thrown against the sides of the enclosure, they are deformed to the point where they cannot be reloaded.

28 Claims, 13 Drawing Sheets

സ5,924,834

MACHINE FOR PROCESSING SCRAP METAL CONTAINERS

CROSS REFERENCE TO RELATED APPLICATION

This is a continuation-in-part of U.S. patent application Ser. No. 08/813,826, filed Mar. 6, 1997, now U.S. Pat. No. 5,829,943, for MACHINE FOR EMPTYING MATERIAL FROM SCRAP CANS, R. M. Davis, inventor.

BACKGROUND OF THE INVENTION

The invention is in the field of machines for processing recyclable material, and particularly concerns machines that process scrap metal containers such as used cans and shell casings.

Scrap aluminum cans, such as soft drink containers, when collected for processing may contain material such as sand and dirt. If not removed, such material results in an apparent increase in the weight of these cans, thereby making calculation of their value difficult. Further, the material contained in the cans may contaminate machinery and product when the cans are processed for further recycling.

Other metal containers, such as shell casings, in the form of either spent rounds or live rounds, must be processed by being deformed to a point where they cannot be reloaded, in order to permit recycling of the material (chiefly brass) of which they are made.

Therefore, there is an urgent need for an effective, inexpensive way to empty scrap cans of their contents quickly, easily, and to deform shell casings, both with a high rate of throughput (thousands of pounds per hour).

SUMMARY OF THE INVENTION

The invention is based upon the inventor's critical realization that simultaneous agitation and controlled ripping of scrap aluminum cans would expose their interiors while shaking out their contents, and that controlled thrashing of shell casings would deform them to the point where reloading would not be possible. The inventor has built a machine that accomplishes these purposes by means of a plurality of blade sets that are mounted on and rotate with a shaft within an enclosure. The blade sets are distributed along the shaft and interleaved with a plurality of angled, stationary vanes. These parts cooperate when the shaft is rotated by propelling scrap metal containers on a helical path. Relatedly, as the shaft rotates, the blade sets rotate with it, imparting a centrifugal force to the containers which throws them against the vanes. The vanes are angled with respect to the shaft in such as way to deflect the containers from one blade set to the next along the shaft, thereby directing the containers on a helical path.

As the blade sets propel them, the cans are struck by the blades, their contents are emptied, and the cans are ultimately propelled to a collection point.

Alternatively, as the blade sets propel the shell casings, they are struck by the blades and thrown against the enclosure, which results in deformation. The shell casings are ultimately propelled to a collection point.

Accordingly, one objective of this invention is the provision of a machine that empties scrap cans of their contents.

Another objection is provision of a machine that deforms shell casings.

Another objective is to provide a machine that uses rotating blades to propel containers on a helical path while striking the containers.

A still further objective is provision of a machine having a plurality of blade sets mounted to rotate with a shaft that propel, rip, agitate and empty scrap cans of their contents.

Still a further objective is provision of the machine having a plurality of blade sets mounted to rotate with a shaft that propel, agitate, thrash, and deform shell casings to such an extent as to prevent their being reloaded.

These and other objectives and advantages will be manifest when the detailed description is read in conjunction with the below-described drawings.

DETAILED DESCRIPTION OF THE PREFERRED EMBODIMENT

Figure 1:
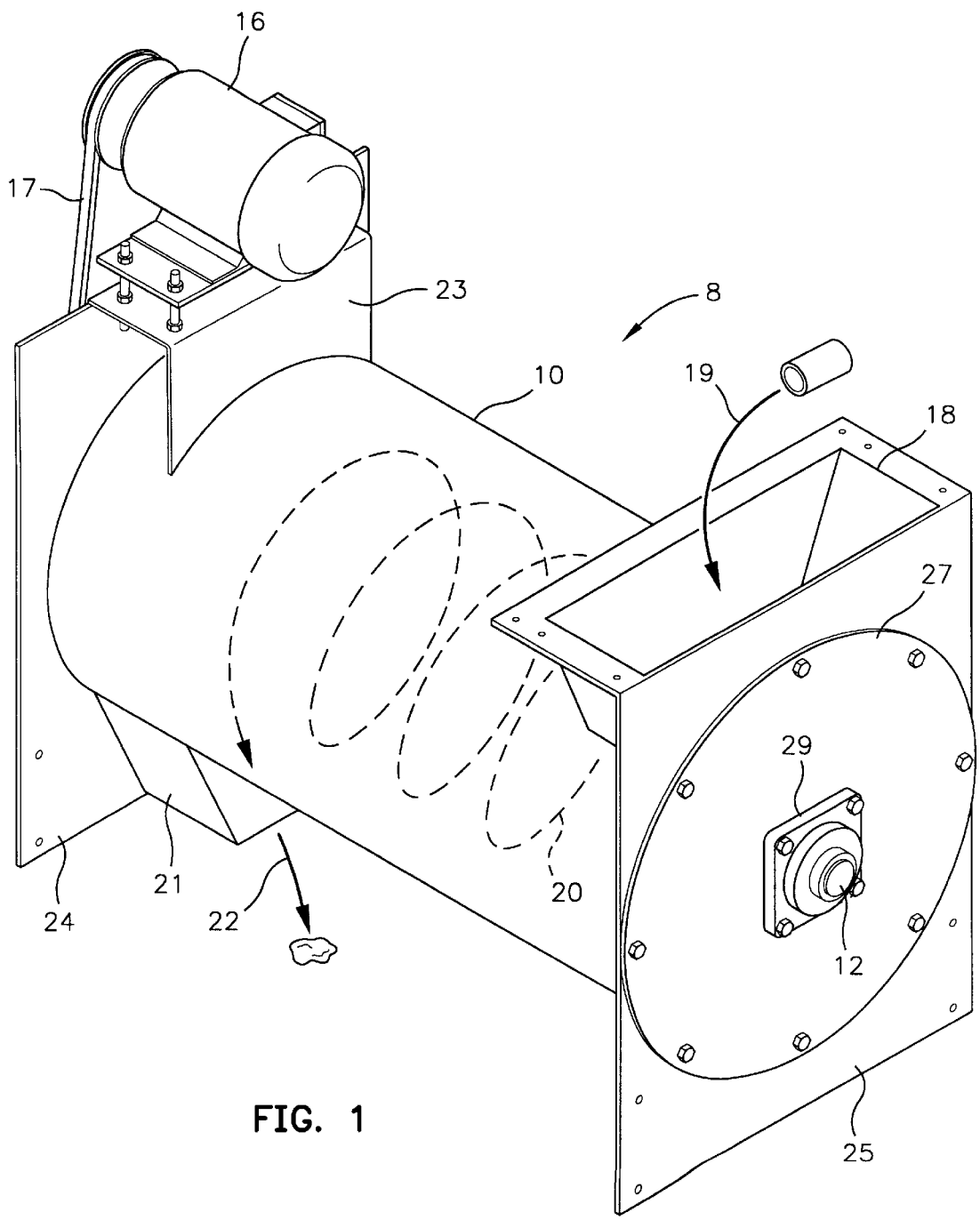
FIG. 1 is a perspective view of the machine of the invention.

The invention is a machine that processes either of at least two types of containers in order to render them in recyclable form. For a first type of container including scrap cans, such as empty aluminum soda cans, the machine operates to extract contents from and otherwise empty the cans in order that an accurate weight and therefore a truer value of the cans might be determined prior to their further processing or rendering. For a second type of container, including shell casings, such as are found in spent or live rounds, the machine operates to thrash and otherwise strike the casings in order to deform them to such an extent that they cannot be reloaded. For either of these scrap metal containers, and for other scrap metal containers or similar objects for which agitation, thrashing, emptying, and/or deformation may be required precedent to recycling, the following embodiments are presented.

In this regard, refer to FIGS. 1 and 3–6 which illustrate the invention in one preferred embodiment that is preferred for emptying used cans. The machine of the invention, indicated generally by 8, includes an enclosure (or housing) 10 in which a rotatable shaft 12 is supported for rotation by a motor 16. The motor 16 is coupled to a drive belt 17 that imparts a rotational force to the rotatable shaft 12. The enclosure 10 comprises a generally right cylindrical section which is constructed using durable, heavy duty materials, such as rolled steel. It is not absolutely necessary to the invention that the enclosure be perfectly right cylindrical; it may, for example, comprise a polygonal cylinder or any other cylinder that is appropriate for containing the scrap cans as they are being processed and for cooperating with parts to be described later that propel the scrap cans in a generally helical path. This path extends from near a first end of the enclosure where the scrap cans are introduced into the enclosure through an input hopper 18 to near a second end of the enclosure 10 where the processed cans are discharged from the machine through a discharge opening that communicates with an output hopper 21. As can thus be seen in FIG. 1, the scrap cans follow a processing path comprising an input path section 19 through the input hopper 18, a generally helical processing path section 20 within the enclosure, and an output path section indicated by the arrow 22.

In this preferred embodiment, the motor 16 is supported near the second end of the enclosure 10 on an angled piece of iron 23 that may be welded to the outside cylindrical surface of the enclosure 10 and to the generally square or rectangular end plate 24 that provides supporting structure at the second end of the enclosure 10. In addition to providing support for the motor 16, the end plate 24 also provides support for the enclosure 10 on the ground or another surface. Another end plate 25 is provided on the first end of the enclosure 10. This end plate provides structure and support for the enclosure at its first end. The respective first and second ends of the enclosure 10 are closed by end disks 27 and 28, which are bolted to the end plates 25 and 24. As shown in FIGS. 1, 3, 4, and 6 respective ends of the rotatable shaft 12 extend through the end disks and are supported in bushing assemblies 29 and 30. The rotatable shaft 12 is driven with a drive wheel 34 mounted to one end of the rotatable shaft 12 which, together with a drive wheel 32 mounted to the motor 16, engages the belt 17 so that the shaft may be rotated by the motor 16. Although the preferred embodiment couples the motor to the shaft by a belt drive assembly, the inventor contemplates that other couplings may be used including, but not limited to, a transmission coupling, a geared coupling, a direct coupling, and so on. Further, although the motor is located at the second end of the enclosure above the discharge hopper 21 the inventor contemplates location of the motor at other positions both on and off the enclosure 10 at either of its ends as design and installation considerations dictate.

Refer now to FIGS. 1–4 and 7–10 for an understanding of how scrap cans are received into the machine 8. The input hopper 18 includes opposing angled side surfaces 36 and 37 that describe the sides of a funnel that is wider at the top of the enclosure 10 and narrower within the enclosure. The funnel opens into the top of the enclosure 10 near its first end. A feed plate 39 (FIG. 7) extends downwardly along ends of the angled surfaces 36, 37 and terminates at an angled bottom surface 40. As can be appreciated with reference to FIG. 7, cans fall through the input hopper 18 into the enclosure 10, contained in a space defined by the angled surfaces 36, 37, and the feed plate 39 and bottom surface 40. From the defined space, cans drop past the rotatable shaft 12 onto an angled feed plane 41 that slopes downwardly from near the first end of the enclosure 10 toward the bottom of the enclosure 10. The feed plane 41 provides a ramp down which scrap cans are fed to a plurality of blade sets, later described.

Although the input hopper has a particular funnel shape in the preferred embodiment, it is possible to use other input configurations to accomplish the function of feeding scrap cans into the enclosure 10 in a concentrated stream that is delivered to the blade sets, without departing from the spirit of the invention. Further, although the input hopper is directly on top of the enclosure 10 near its first end, this is not intended to so limit the introduction of scrap cans into the machine 8. Indeed, if design or installation considerations dictate, an input hopper may be provided on the outside of the end plate 25. Location of the hopper may also be rotated to the left or right with respect to the end disk 27.

Figure 11:
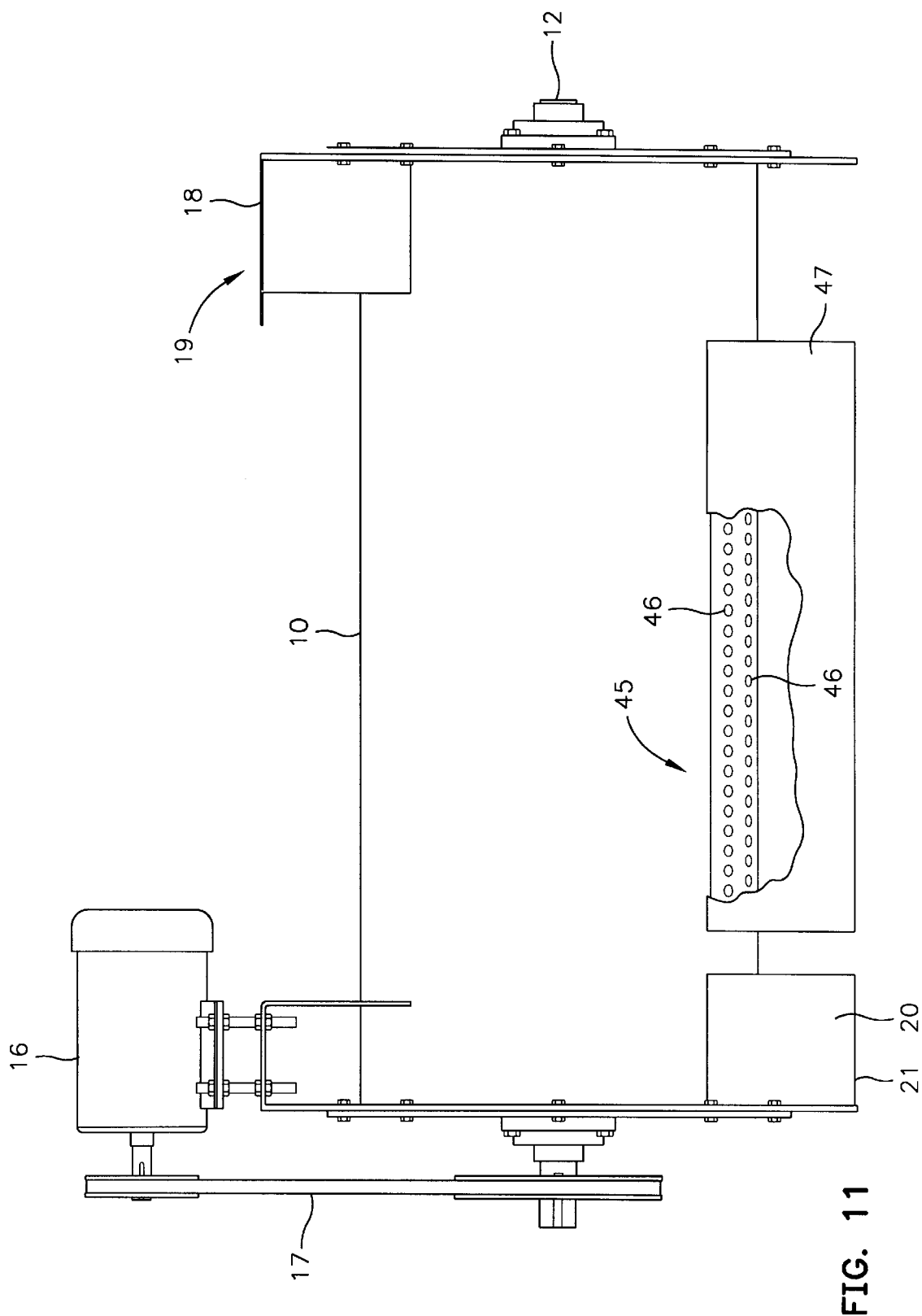
FIG. 11 is a side elevation view of the machine of the invention with a portion cut away to show a screen.

In the preferred embodiment, sand, grit, dirt, and other material, including liquid, that is extracted from inside scrap cans according to the invention falls inside the enclosure 10 to the bottom of the enclosure. This material, which is agitated by the flow of scrap cans is, in the preferred embodiment, screened out of the enclosure by a screen opening 45 (see FIG. 11) that comprises a plurality of apertures 46 that open through the bottom of the enclosure. Other appropriate screen configurations may be employed to filter material dislodged from the interior of scrap cans out of the enclosure 10. FIG. 11 shows the screen opening 45 enclosed on the outside of the enclosure 10 by a trap 47 that may be removed or otherwise accessed to extract and discard the material dislodged from inside the scrap cans.

Figure 2:
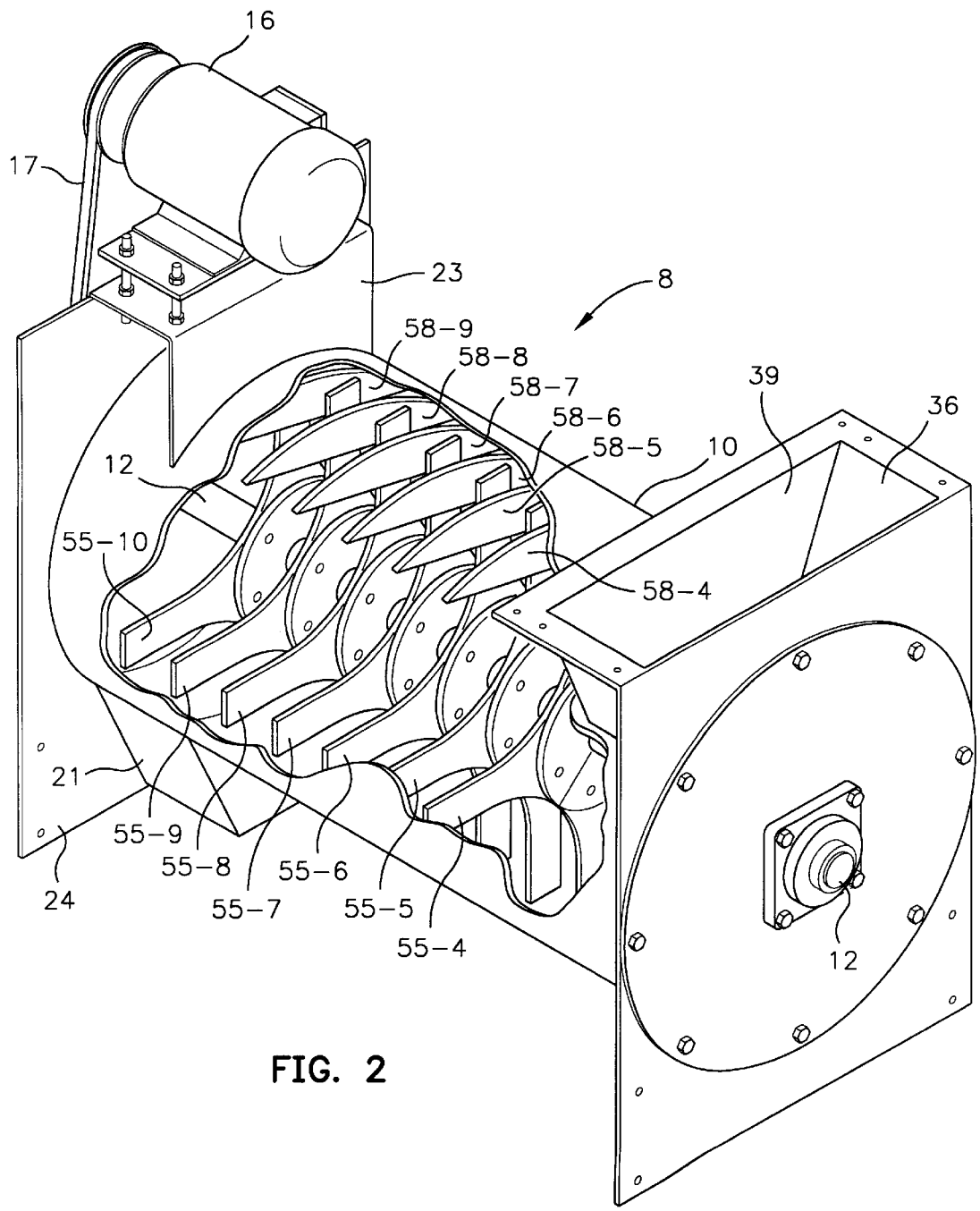
FIG. 2 is a perspective view of the machine of the invention with a portion of a housing cut away to show vanes and blade sets.
Figure 3:
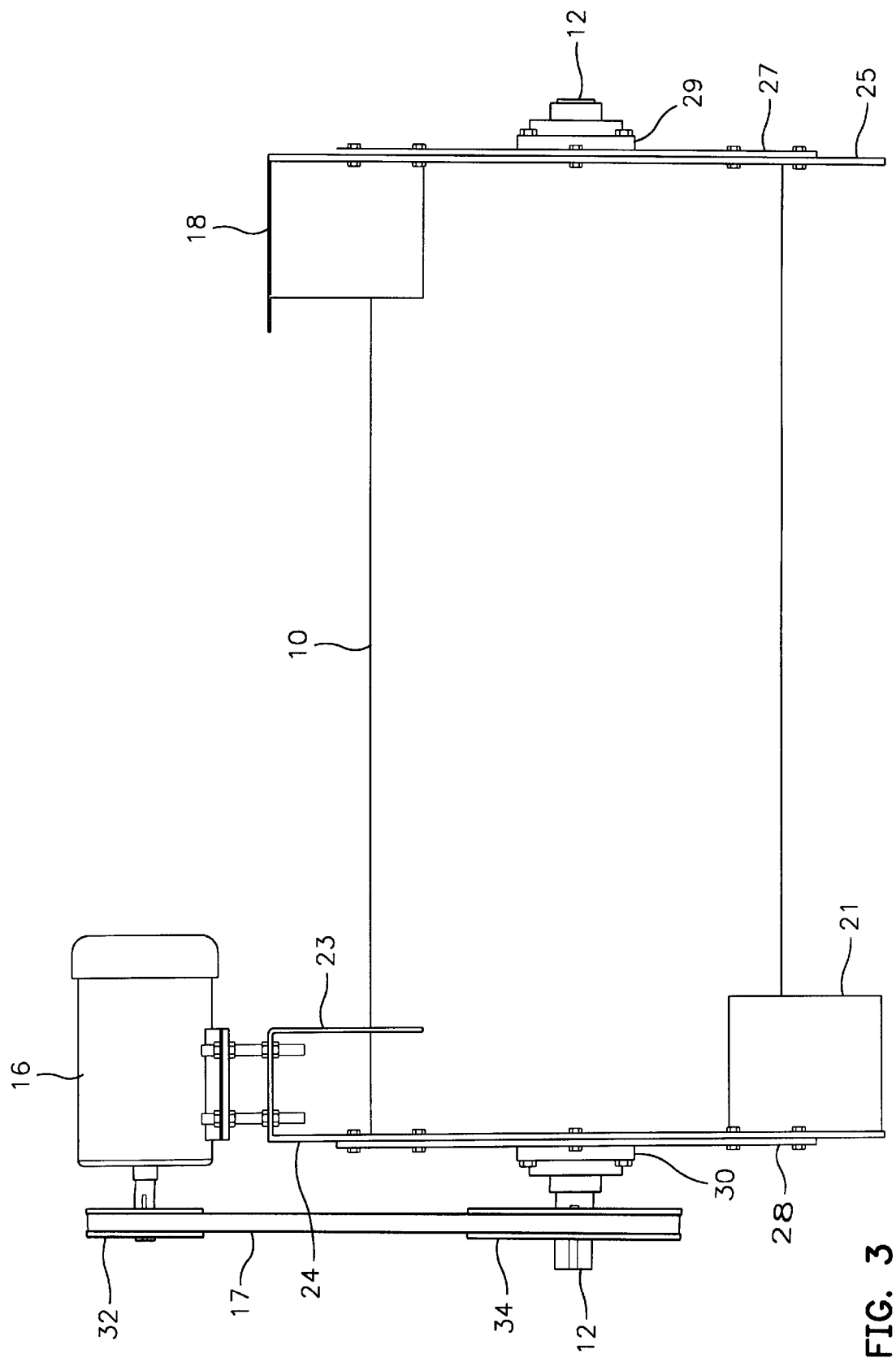
FIG. 3 is a side elevation view of the machine of the invention.
Figure 4:
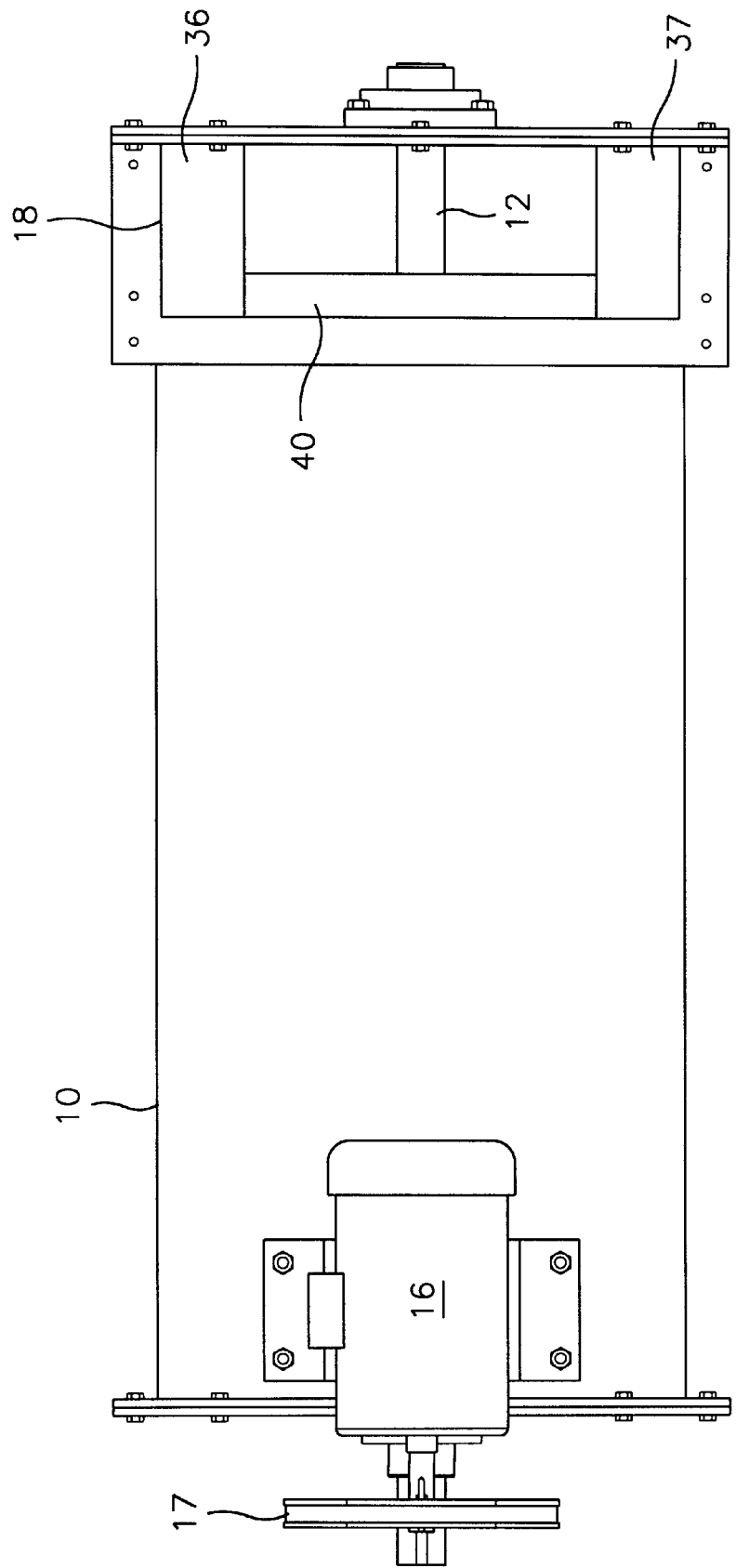
FIG. 4 is a top plan view of the machine of the invention.
Figure 7:
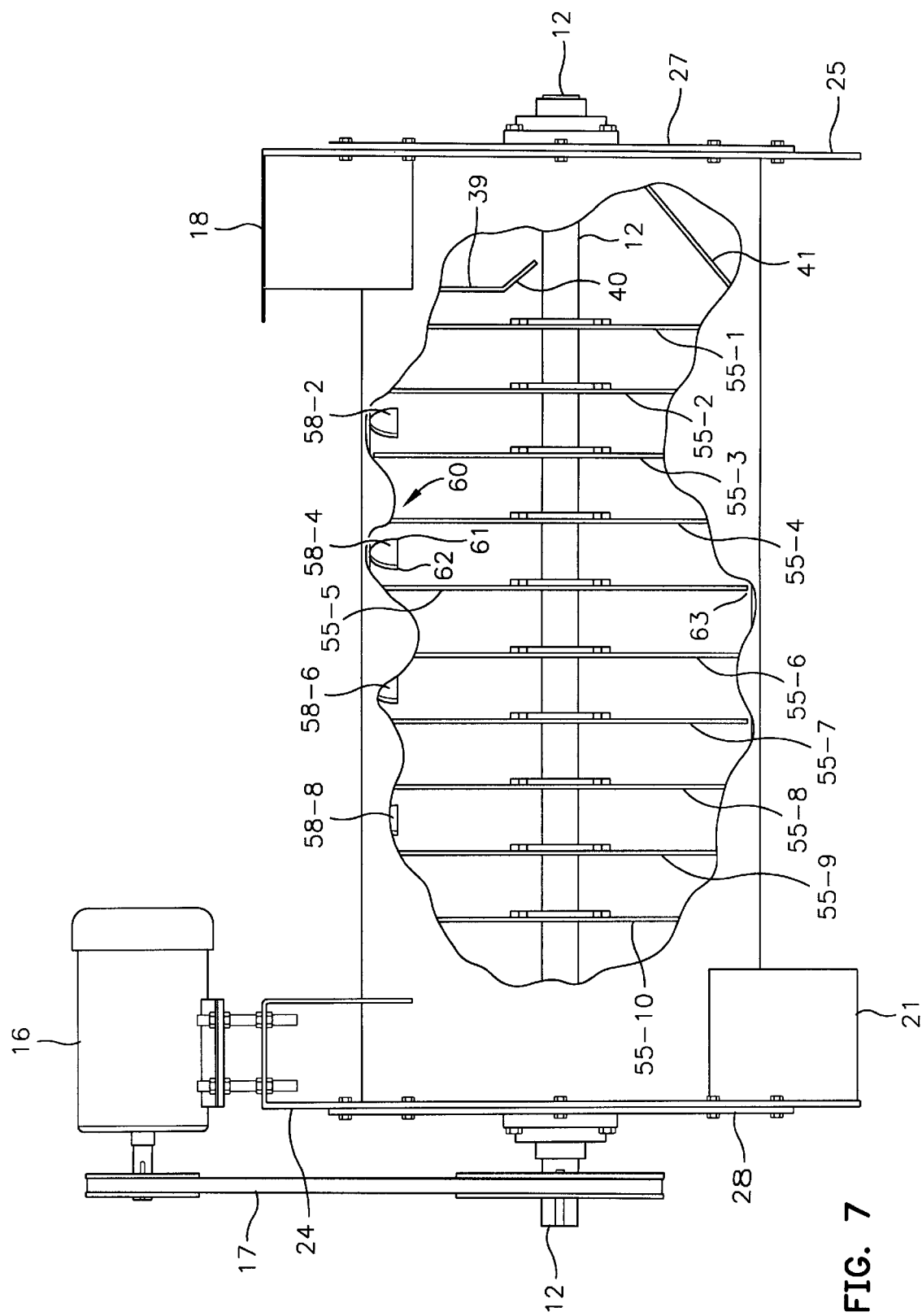
FIG. 7 is a side elevation view of the machine of the invention with a portion of the housing cut away to show the arrangement of vanes and blade sets.
Figure 8:
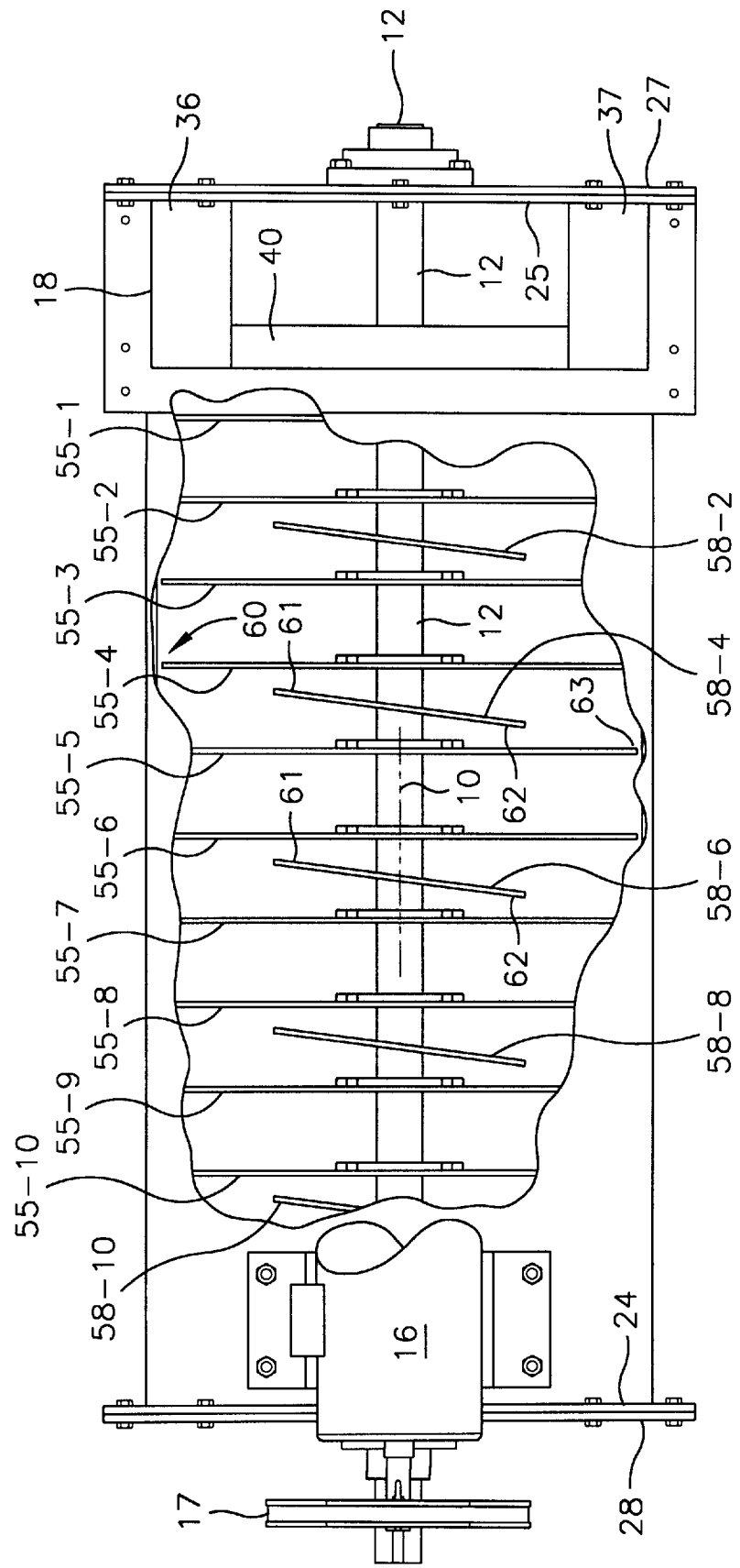
FIG. 8 is top plan view of the machine of the invention with a portion of the housing cut away to show the arrangement of the vanes and blade sets.

Refer now FIGS. 2 and 7–10 which illustrate a plurality of blade sets 55-1 through 55-10 that are made from a hard durable material, such as steel and are mounted on the rotatable shaft 12 for rotation with the shaft. The blade sets all have identical structures, which correspond to the structure of the blade set 55-1 shown in FIG. 9. In this regard, the blade set 55-1 in the preferred embodiment includes four blades 56-1 through 56-4 and a disk 57 to which the blades are bolted and which is mounted on the rotatable shaft 12 by brazing, welding, or any other mode of attachment. As best seen in FIGS. 2, 7, and 8, the blade sets 55-1 through 55-10 of the preferred embodiment are mounted in a sequence along the rotatable shaft 12 with generally equal spacing between the sets, although the spacing may be unequal, if desired or necessary.

A plurality of stationary vanes 58-1 through 58-10 are fixedly mounted to the top of the inside surface of the enclosure 10 in a spaced sequence that interleaves the vanes with the blade sets. Preferably, the vanes are made from a hard durable material, such as rolled steel and are attached to the inside surface of the enclosure by conventional means such as brazing or welding. In the preferred embodiment, the vanes are distributed generally in line along the top of the interior of the enclosure 10. As shown in FIGS. 2 and 8, each vane is non-orthogonal with respect to the rotatable shaft 12, forming non-perpendicular angles with the rotatable shaft 12. Further, all of the vanes 58-1 through 58-10 have two ends and are mounted such that, for each vane, a first end is relatively nearer the first end of the enclosure 10 than its second end and its second end is relatively nearer the second end of the enclosure than its first end. In FIG. 8 this is illustrated for the vane 58-6 which has a first end 61 and a second end 62, the first end 61 being nearer the first end of the enclosure (and a corresponding first end of the rotatable shaft 12) than its second end 62 and the second end 62 being relatively nearer the second end of the enclosure 10 (and a corresponding second end of the rotatable shaft 12) than the first end 61.

The just-described arrangement is preferred; however, the locations of the vanes can also be distributed or otherwise arranged circumferentially around the cylinder in, for example, the form of a helical path.

Figure 9:
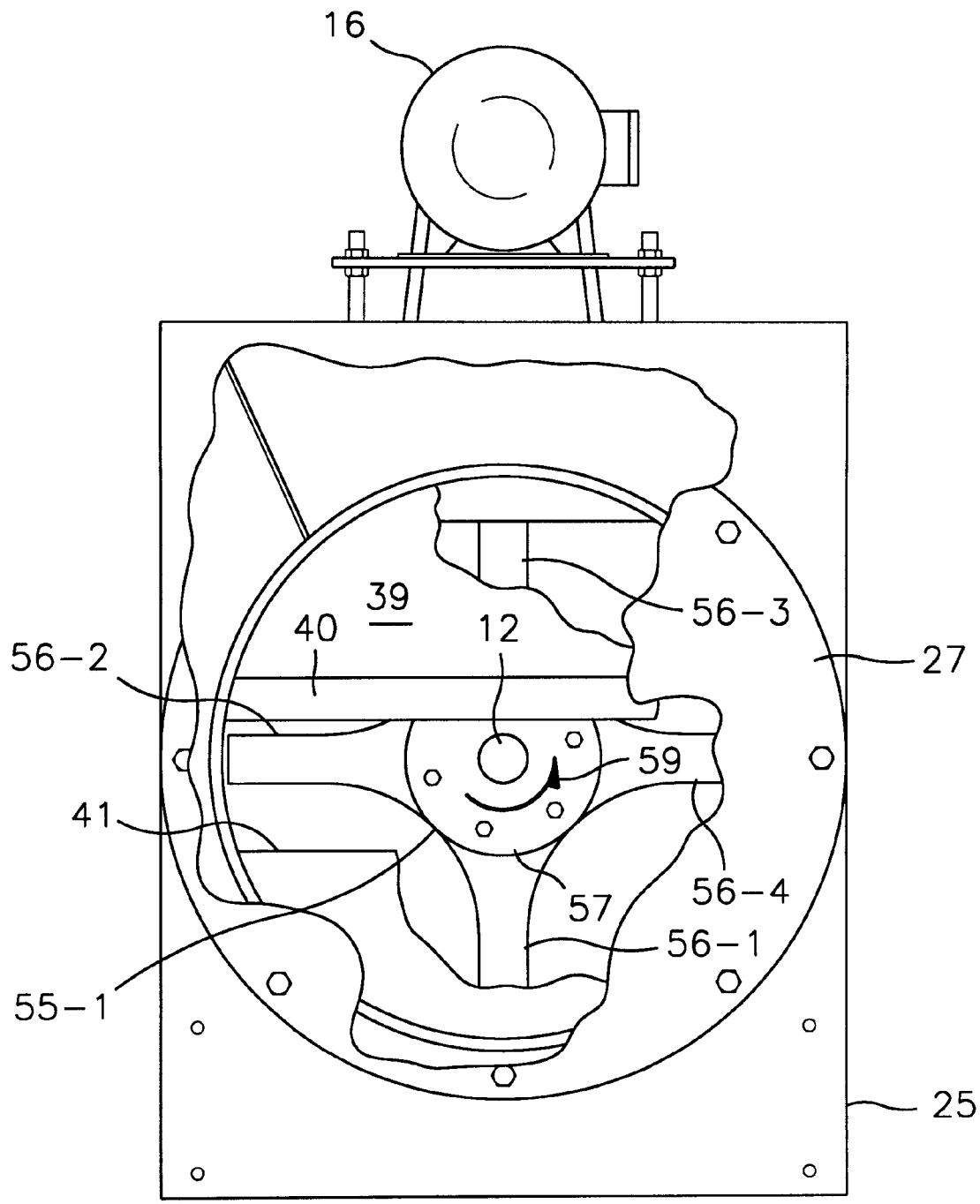
FIGS. 9 and 10 show the end view of a machine according to FIG. 6, with various portions cut away to expose details of the interior of the machine.
Figure 10:
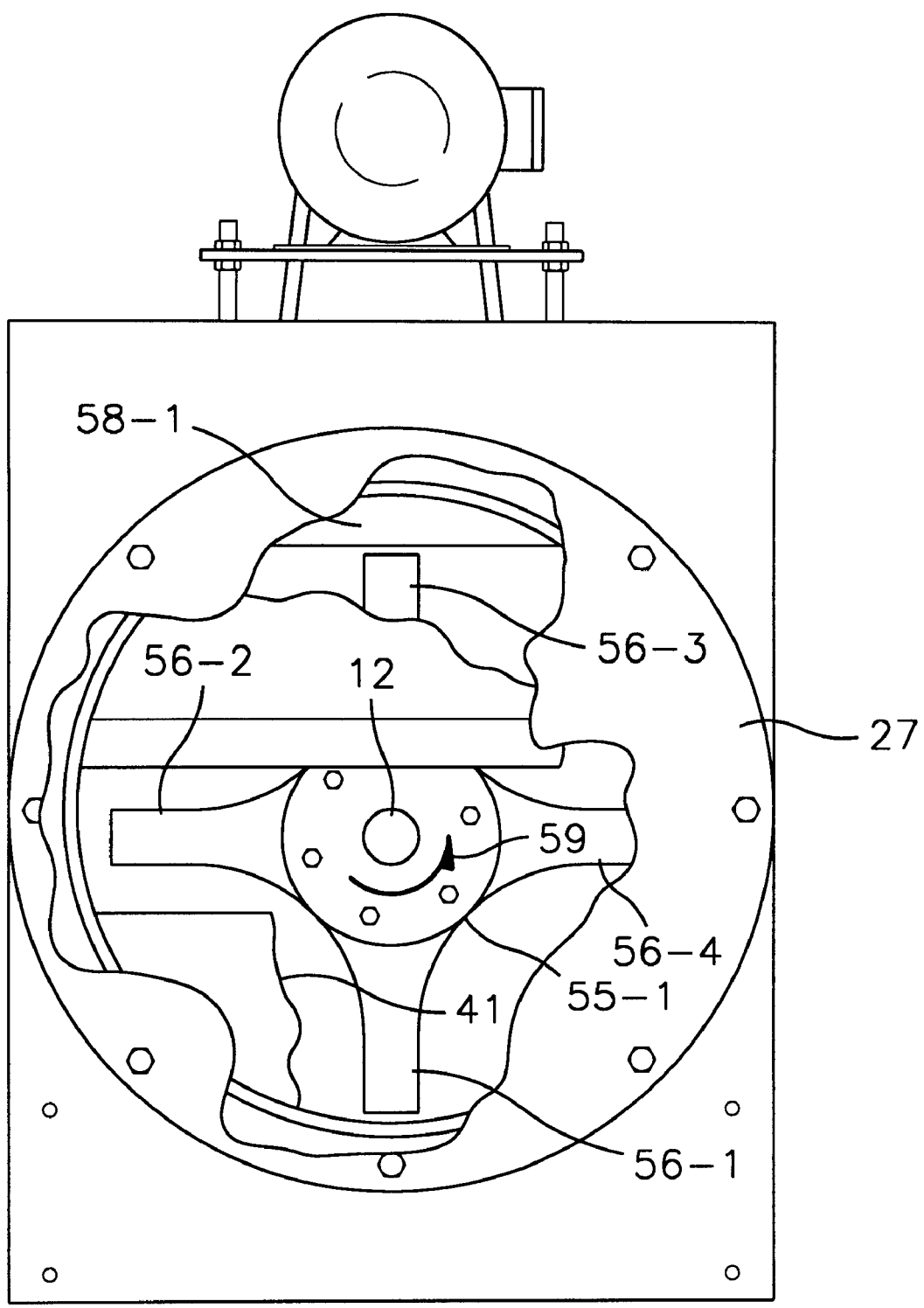

Referring now to FIG. 2, 9, and 10, the rotatable shaft 12 and blade sets 55-1 through 55-10 are rotated counter-clockwise as indicated by the arrow 59. Viewing the machine from the first end in FIG. 9, it will be appreciated that the blade sets propel the cans in a generally downward direction in the left half of the enclosure, and generally upwardly in the right half of the enclosure. This rotation imparts centrifugal force to the cans. The cooperative relationship between the blade sets 55-1 through 55-10 and the vanes 58-1 through 58-10 can be appreciated with reference to FIGS. 7 and 8. With rotation in the counter-clockwise direction, the blade tip 60 on blade set 55-4 moves past the vane 58-4 from the end 61 to the end 62 of the vane 58-4. The angle θ which the vane 58-4 makes with respect to the axis of the rotatable shaft 12 will deflect a can that is propelled by the blade 60 from the blade set 55-4 in the direction of the blade set 55-5 where the can will next be propelled by the blade tip 63 of the blade set 55-5. In this fashion, the cooperative relationship of the blade sets and vanes moves scrap cans that are fed into the machine 8 through the hopper 18 incrementally from the input hopper 18 toward, to, and through the output hopper 21. The mean path followed by the cans is helical, although any one can may not trace a perfectly helical path from the input hopper 18 to the output hopper 21.

As the tips of the blades on the blade sets encounter the cans, the mass of the blade tips and their rotational speed deform and perforate the cans, thereby agitating and opening the cans. In addition, within the enclosure, the cans are hurled against the inside surface of the enclosure and against the vanes. On any one can the force of numerous impacts with blade tips, vanes, and the inside surface of the enclosure will agitate the can, loosening its contents, perforating it, and shaking the contents out of the can. Contents dropped to the bottom of the enclosure tin through which they exit by way of the screen opening 45.

Those skilled in the art will appreciate that reversal of the rotation of the rotatable shaft in blade sets, coupled with a change in the angles which the vanes make with the shaft will allow the invention to operate as intended.

In the best mode for can processing, the general diameter of the enclosure is 36" and the diameter of the blade set is 32-½". Each blade set weighs approximately ten (10) pounds. Preferably, there are ten blade sets arrayed in the enclosure, which is eight to ten feet in length. The motor 16 is rated at 7.5 horsepower. At full speed and with the general relationship between the drive wheels 32 and 34 shown in FIG. 5, the blade sets may be rotated at approximately 600 RPM. With these specifications, the inventor has determined that the standard aluminum drink can would be battered, crumpled, and perforated, but not shredded in such a way as to generate aluminum flakes or shards. Advantageously, these specifications meet the objective of emptying the cans, without wasting aluminum. In operation, the machine with these specifications processes approximately 5,000 pounds per hour of scrap aluminum soft drink cans.

One aspect of the cooperative relationship between the blade sets and the vanes may be appreciated with reference to FIGS. 9 and 10. In FIG. 9, the location of the axis of the rotatable shaft 12 with respect to the center line of the enclosure 10 is such that the shaft 12 rotates on the central axis of the enclosure 10. Further, the length of each blade on a blade set is such that the tip of each blade rotates through a plane met by the lower edge of each vane. However, it maybe advantageous to vertically separate the blade tips and vanes. In FIG. 10, this is represented by a small space between the tip of the blade 56-3 and the lower edge of the vane 58-1. With spacing between the tops of the blade sets and the bottoms of the vanes, if a blade bends, it is less likely to hit a vane and jam the machine. However, there may be a tradeoff with respect to the processing of the cans. In this regard, more space between the top of the blade set and the bottom of the vane might result in reduction of the battering and splitting which the scrap cans undergo. Closure of the space between the bottoms of the vanes and the tops of the blade sets by either increasing the size of the vanes, offsetting the axis of the rotatable shaft toward the vanes, or other steps might result in a better agitation of the scrap cans. Further, the generally helical trace of the path traveled by the cans may be achieved by many blade/vane combinations, and by variations of the components discussed above. For example, the vanes may be curved. Also, the blades themselves may be twisted like a fan or propeller blade so that they not only strike the cans, but also propel them forwardly. In this latter regard, vanes may be disposed with. In any event, these tradeoffs and many other modifications, changes, and additions to the machine may be made without departing from the spirit and scope of this invention.

Figure 5:
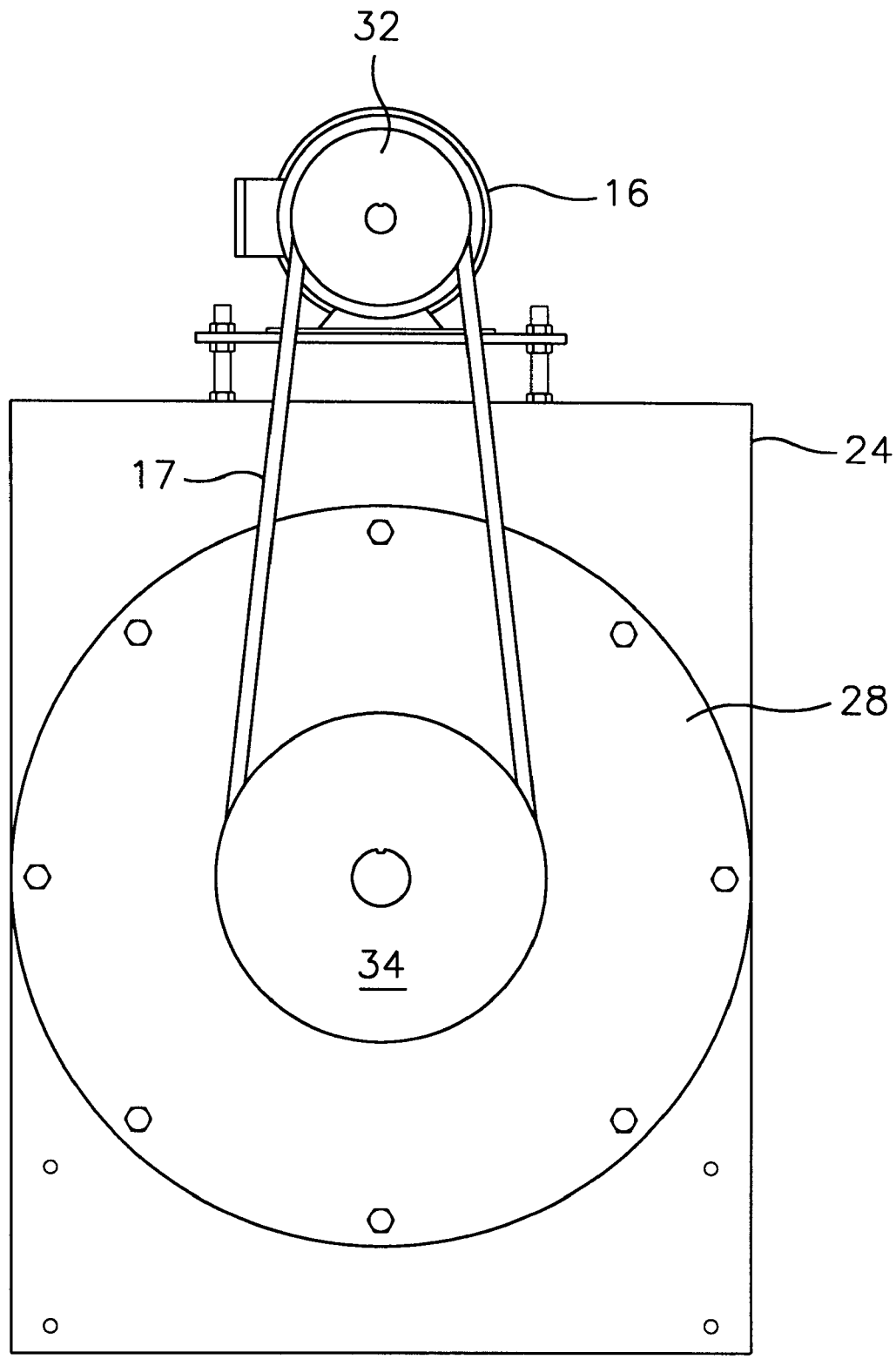
FIG. 5 is an end elevation view at a first end of the machine.
Figure 6:
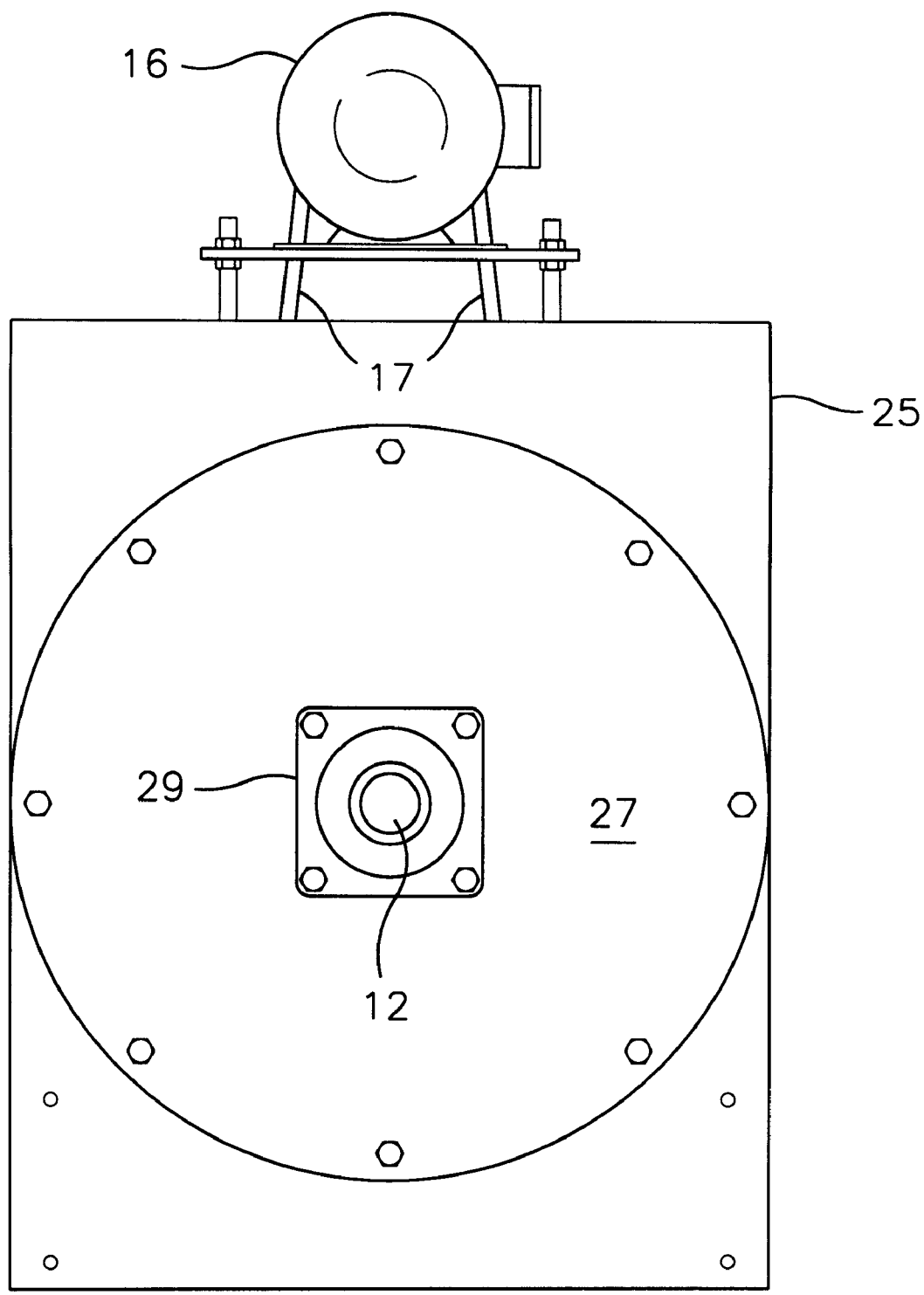
FIG. 6 is an end elevation view at a second end of the machine.
Figure 12A:
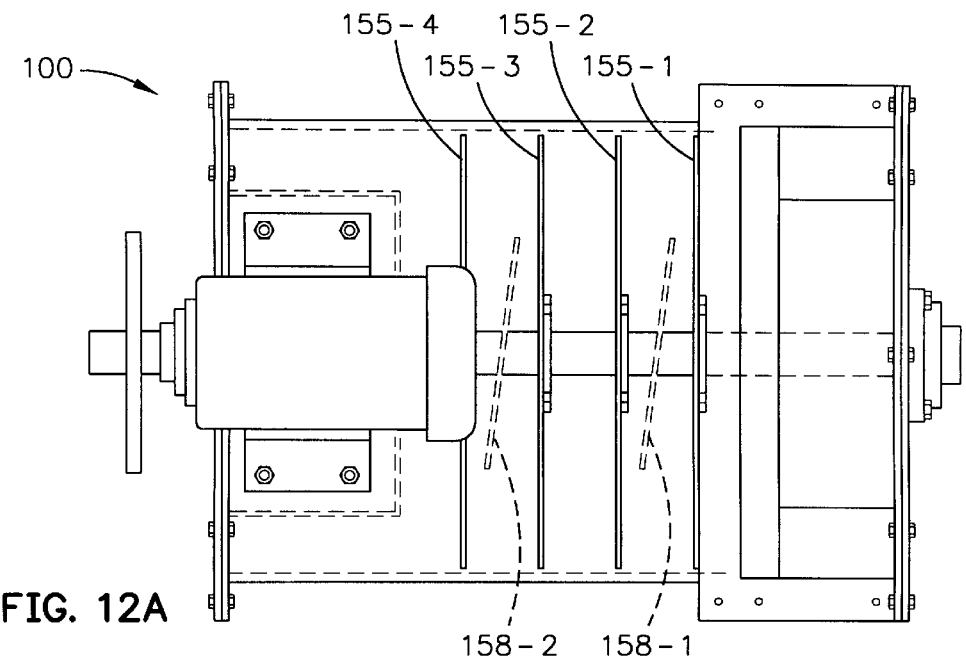
FIGS. 12A, 12B and 12C are top sectional, side sectional and front end views, respectively, of a machine according to the invention for processing shell casings.
Figure 12B:
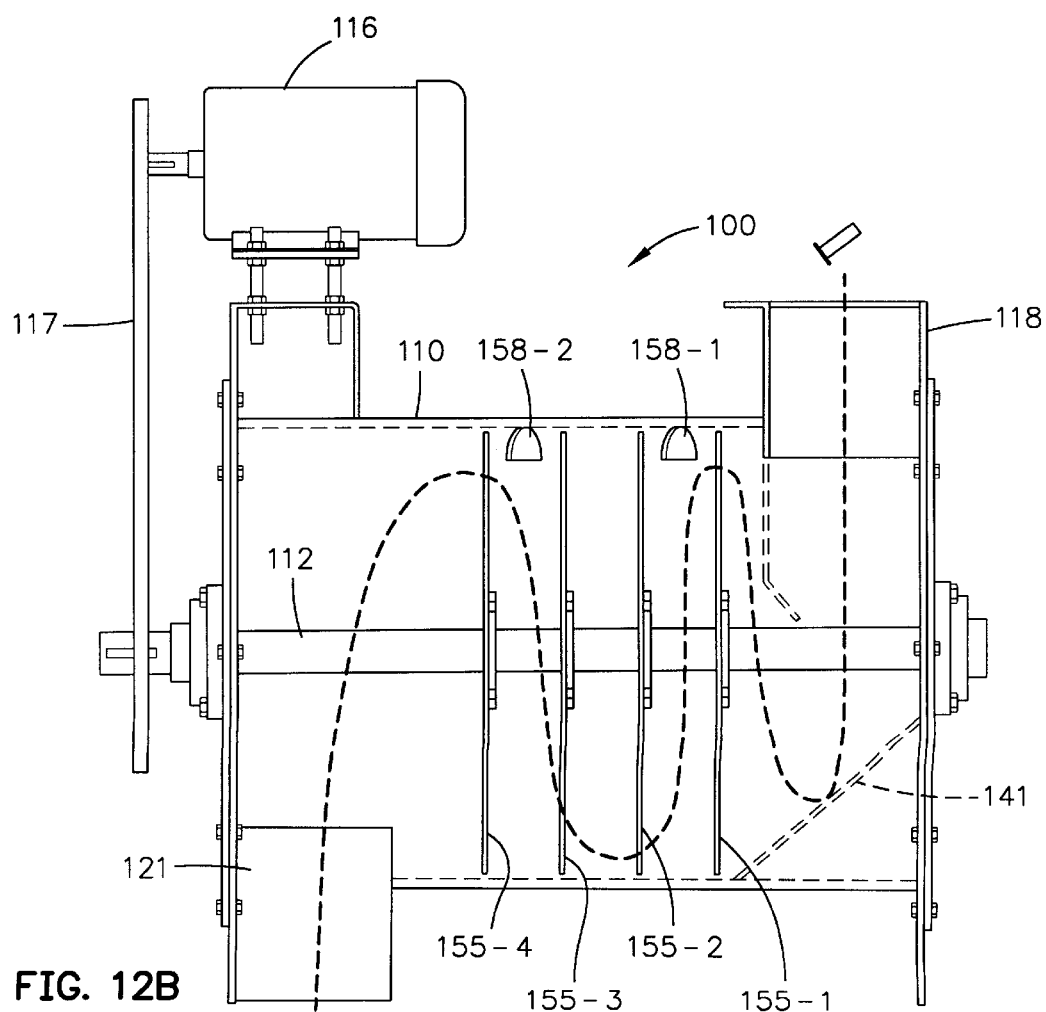
Figure 12C:
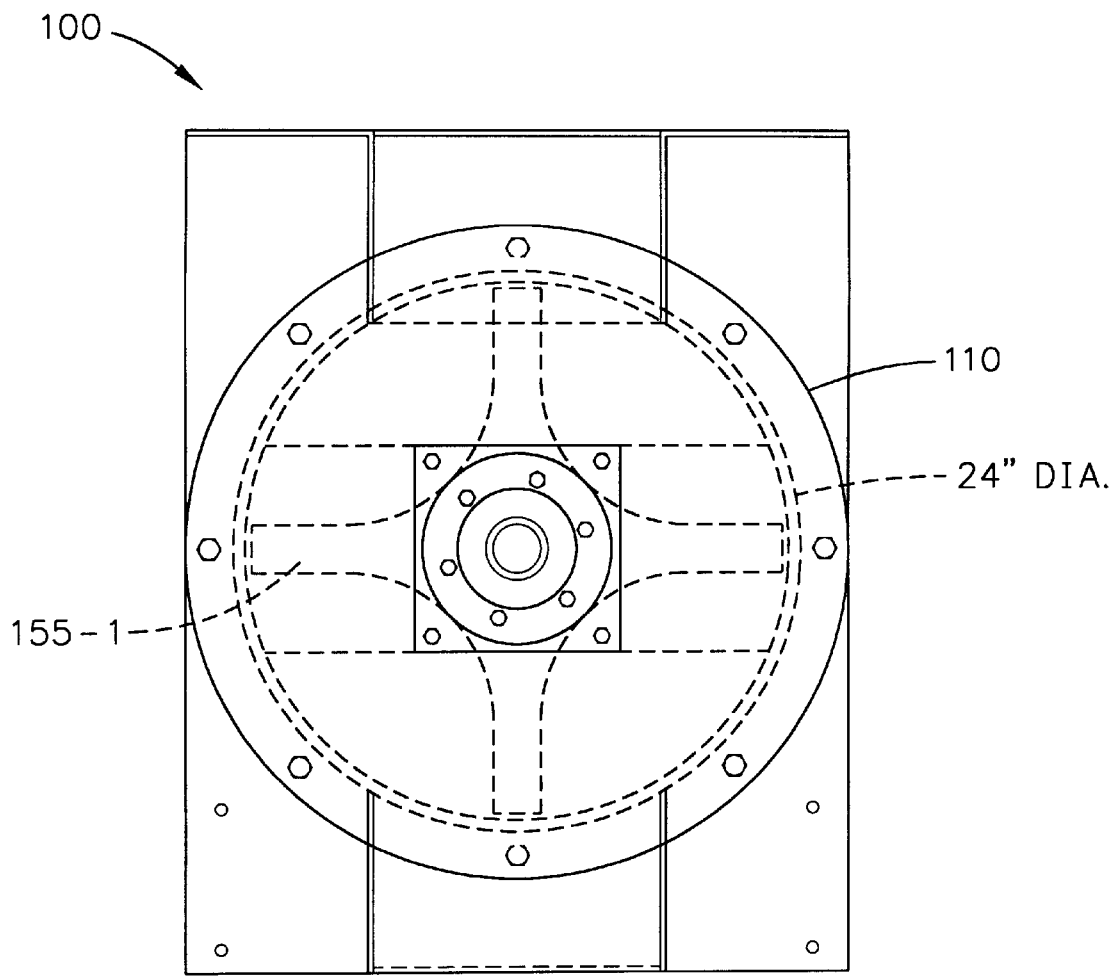

The preferred embodiment and best mode of a machine 100 according to the invention that is adapted for processing shell casings of spent and live rounds is illustrated in FIGS. 12A–12C. The machine 100 of FIG. 12A–12C is the same as the machine of FIGS. 1–11 in most respects. It includes an enclosure 110 in which a rotatable shaft 112 is supported for rotation by a motor 116. The motor 116 is coupled to a belt drive 117 that imparts a rotational force to the rotatable shaft 112. An input hopper 118 receives shell casings 101 that drop onto an angled feed plane 141. A plurality of blade sets 155-1 through 155-4, each with four blades and mounted to the rotatable shaft 112, cooperate with vanes 158-1 and 158-2 to propel shell casings on a generally helical path through the enclosure 110. The blade sets and vanes are made and mounted in the enclosure 110 as described above with reference to FIGS. 1–11. The shell casings are propelled, agitated, thrashed, and thrown against the interior surface of the enclosure 110. One pass through the enclosure 110 in this manner is enough to deform the shell casings to the extent that they are rendered unfit for reloading. At the end, the deformed shell casings exit the enclosure 110 through output hopper 121. In the best mode, the general diameter of the enclosure 110 is 24" and the diameter of each blade set is 22". Each blade set weighs approximately six (6) pounds. Preferably, there are four blade sets arrayed in the enclosure, which is approximately 3 feet, in length. In this embodiment, the motor 116 is rated at 5.0 horsepower and with the blades driven for example as illustrated in FIG. 5, the blade sets may be rotated at approximately 600 RPM. With these specifications, the inventor has determined that rounds such as 0.30 and 0.50 caliber, as well 20 mm, would be thrashed, battered, crumpled, and deformed in such a way as to prevent their being reloaded. Advantageously, these specifications meet the objective of deforming the shell casings, without wasting the material of which they are made. In operation, the machine illustrated in FIGS. 12A–12C processes approximately 5,000 lbs/per hour of shell casings. Assuming no need to empty the shell casings, a screen would not have to be provided on the bottom portion of the machine shown in FIGS. 12A–12C. Otherwise, if necessary, a screen may be provided.

I claim:

1. A machine for processing scrap metal containers, comprising:

an enclosure;

a shaft rotatably mounted in the enclosure;

a plurality of rotatable blade sets mounted on the shaft, each blade set being displaced along the shaft from an adjacent blade set;

a plurality of vanes mounted to the inside of the enclosure so as to be along a generally helical path around the shaft;

the plurality of vanes being interleaved with the plurality rotatable blade sets;

an input opening through the enclosure near a first end of the shaft;

a discharge opening in the enclosure near a second end of shaft; and a screen opening in the enclosure between the input opening and the discharge opening.

2. The machine of claim 1, further including a motor coupled to the shaft for rotating the shaft and the plurality of blade sets.

3. The machine of claim 1, wherein the vanes are mounted substantially along a line in the enclosure that is substantially parallel to the shaft.

4. The machine of claim 3, wherein the enclosure is an elongate cylinder having a central axis that is substantially collinear with the shaft, and the vanes are mounted above the shaft.

5. The machine of claim 4, wherein the enclosure is substantially right cylindrical.

6. The machine of claim 4 further including an input hopper in communication with the input opening, the input hopper being generally above the shaft and the discharge opening being generally below the shaft.

7. The machine of claim 6, further including a screen opening in the enclosure below the shaft, between the input hopper and the discharge opening.

8. The machine of claim 7, further including a motor coupled to the shaft for rotating the shaft and the plurality of blade sets.

9. The machine of claim 8, wherein at least one blade set includes a plurality of blades that describe a circular path of rotation, the circular path of rotation being beneath a plane that is met by lower edges of the plurality of the vanes.

10. A machine for processing used metal containers, comprising:

an enclosure with two ends;

a shaft rotatably mounted in the enclosure;

a plurality of blade sets mounted on the shaft to rotate with the shaft, each blade set being displaced from an adjacent blade set along the shaft;

a plurality of vanes interleaved with the plurality of blade sets and mounted to the inside of the enclosure, each vane of the plurality of vanes having two ends, all vanes having corresponding first ends and corresponding second ends, each vane mounted in the enclosure such that its first end is relatively nearer a first end of the shaft than its second end and such that its second end is relatively nearer a second end of the shaft than its first end;

an input opening through the enclosure near the first end of the shaft; and a discharge opening in the enclosure near the second end of the shaft.

11. The machine of claim 10, further including a screen opening in the enclosure between the input opening and the discharge opening.

12. The machine of claim 10, further including a motor coupled to the shaft for rotating the shaft and the plurality of blade sets.

13. The machine of claim 10, wherein the vanes are mounted substantially along a line in the enclosure that is substantially parallel to the shaft.

14. The machine of claim 13 wherein the enclosure is an elongate cylinder having a central axis that is substantially collinear with the shaft, and the vanes are mounted above the shaft.

15. The machine of claim 14, wherein the enclosure is substantially right cylindrical.

16. The machine of claim 14, further including an input hopper in communication with the input opening, the input hopper being generally above the shaft and the discharge opening being generally below the shaft.

17. The machine of claim 16, further including a screen opening in the enclosure below the shaft, between the input hopper and the discharge opening.

18. The machine of claim 17, further including a motor coupled to the shaft for rotating the shaft and the plurality of blade sets.

19. The machine of claim 18, wherein at least one blade set includes a plurality of blades that describe a circular path of rotation, the circular path of rotation being beneath a plane that is met by lower edges of the plurality of the vanes.

20. A machine for agitating and deforming metal containers, comprising:

an enclosure with two ends;

a shaft rotatably mounted in the enclosure;

a plurality of blade sets mounted on the shaft for rotating therewith to strike metal containers and drive them through the enclosure;

an input opening in the enclosure for receiving metal containers;

a discharge opening in the enclosure for discharging metal containers; and a screen in the enclosure between the input opening and the output opening.

21. The machine of claim 20, further including a plurality of vanes mounted to the inside of the enclosure along a generally helical path around the shaft.

22. The machine of claim 20 further including a motor coupled to the shaft for rotating the shaft and the plurality of blade sets.

23. The machine of claim 20, wherein the containers are cans.

24. The machine of claims 20, wherein the containers are shell casings.

25. A method for processing metal containers by agitating and thrashing, in an enclosure within which a plurality of blade sets are mounted for rotation on a shaft, comprising;

rotating the blades;

pouring metal containers into the enclosure;

striking the metal containers with the rotating blades;

moving the metal containers through the enclosure with the rotating blades; and receiving the metal containers from the enclosure.

26. The method of claim 25, further comprising screening material from the metal containers with the enclosure.

27. The method of claim 25, wherein the metal containers are cans.

28. The method of claim 25, wherein the metal containers are shell casings.

* * * * *